(12) United States Patent
Yang et al.

(10) Patent No.: US 10,989,953 B2
(45) Date of Patent: Apr. 27, 2021

(54) DISPLAY PANEL, MANUFACTURING METHOD THEREOF, AND DISPLAY DEVICE

(71) Applicant: BOE TECHNOLOGY GROUP CO., LTD., Beijing (CN)

(72) Inventors: Yafeng Yang, Beijing (CN); Wei Wang, Beijing (CN); Xiaochuan Chen, Beijing (CN); Xue Dong, Beijing (CN); Jifeng Tan, Beijing (CN); Jian Gao, Beijing (CN); Xiandong Meng, Beijing (CN); Xianqin Meng, Beijing (CN); Wenqing Zhao, Beijing (CN); Feng Guan, Beijing (CN); Lu Yu, Beijing (CN); Congcong Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 364 days.

(21) Appl. No.: 15/776,392

(22) PCT Filed: Sep. 21, 2017

(86) PCT No.: PCT/CN2017/102682
§ 371 (c)(1),
(2) Date: May 15, 2018

(87) PCT Pub. No.: WO2018/129954
PCT Pub. Date: Jul. 19, 2018

(65) Prior Publication Data
US 2020/0271991 A1    Aug. 27, 2020

(30) Foreign Application Priority Data
Jan. 13, 2017 (CN) .......................... 201710025116.4

(51) Int. Cl.
*G02F 1/1335* (2006.01)
*G02B 5/18* (2006.01)
(Continued)

(52) U.S. Cl.
CPC ..... *G02F 1/133528* (2013.01); *G02B 5/1866* (2013.01); *G02B 27/1006* (2013.01);
(Continued)

(58) Field of Classification Search
CPC ......... G02F 1/133528; G02F 1/133504; G02F 2001/133548; G02F 2001/13355;
(Continued)

(56) References Cited

U.S. PATENT DOCUMENTS 8,960,915 B2 * 2/2015 Tominaga ............... B82Y 20/00
353/20
2005/0041174 A1   2/2005 Numata et al.
(Continued)

FOREIGN PATENT DOCUMENTS

CN        104676387 A       6/2015
CN        105182604 A      12/2015
(Continued)

OTHER PUBLICATIONS

International Search Report and Written Opinion for PCT Patent Application No. PCT/CN2017/102682, dated Dec. 6, 2017, 16 pages (3 pages of English Translation and 13 pages of Original Document).

(Continued)

*Primary Examiner* — Hoan C Nguyen
(74) *Attorney, Agent, or Firm* — Womble Bond Dickinson (US) LLP

(57) ABSTRACT

Embodiments of the present disclosure provide a display panel, a method for manufacturing the same, and a display device, relating to the field of display technology. The display panel includes a first substrate, a second substrate, a liquid crystal layer disposed between the first substrate and the second substrate, and a light splitting structure disposed on a side of the first substrate facing away from the liquid (Continued)

crystal layer. The light splitting structure is configured to perform spectroscopic processing on light incident on the light splitting structure to obtain light of at least one color, and project the light of the at least one color onto a pixel of a corresponding color in the display panel.

9 Claims, 5 Drawing Sheets

(51) Int. Cl.
*G02B 27/10* (2006.01)
*G02B 27/28* (2006.01)
*G02B 27/42* (2006.01)

(52) U.S. Cl.
CPC ......... *G02B 27/283* (2013.01); *G02B 27/425* (2013.01); *G02B 27/4244* (2013.01); *G02F 1/133504* (2013.01); *G02F 1/13355* (2021.01); *G02F 1/133548* (2021.01)

(58) Field of Classification Search
CPC ............. G02F 2201/30; G02F 2202/36; G02F 1/13355; G02F 1/133548; G02B 5/1866; G02B 2/1006; G02B 27/283; G02B 27/4244; G02B 2/425; G02B 27/425; G02B 27/1006
See application file for complete search history.

(56) References Cited

U.S. PATENT DOCUMENTS

| | | | |
|---|---|---|---|
| 2015/0109666 A1* | 4/2015 | Wei | G02B 30/25 359/462 |
| 2015/0268399 A1* | 9/2015 | Futterer | G02B 30/00 315/151 |
| 2017/0045660 A1 | 2/2017 | Tang | |
| 2017/0363907 A1* | 12/2017 | Wang | G02F 1/133528 |
| 2018/0019265 A1* | 1/2018 | Tan | G02F 1/133 |
| 2018/0107064 A1 | 4/2018 | Bai | |
| 2018/0129113 A1* | 5/2018 | Wang | H01L 51/5262 |

FOREIGN PATENT DOCUMENTS

| | | | |
|---|---|---|---|
| CN | 105700233 A | | 6/2016 |
| CN | 105974647 A | | 9/2016 |
| CN | 205809479 U | | 12/2016 |
| CN | 106292051 | * | 1/2017 |
| CN | 106773263 A | | 5/2017 |
| JP | 2007256852 A | * | 10/2007 |

OTHER PUBLICATIONS

Office Action for Chinese Patent Application No. 201710025116.4 dated Jun. 25, 2018, 15 pages (8 pages of English Translation and 7 pages of Office Action).

* cited by examiner

--Prior Art--

DISPLAY PANEL, MANUFACTURING METHOD THEREOF, AND DISPLAY DEVICE

RELATED APPLICATIONS

The present application is the U.S. national phase entry of the international application PCT/CN2017/102682, with an international filing date of Sep. 21, 2017, which claims the benefit of Chinese Patent Application No. 201710025116.4, filed on Jan. 13, 2017, the entire disclosures of which are incorporated herein by reference.

TECHNICAL FIELD

The present disclosure relates to the field of display technology, and particularly to a display panel, a manufacturing method thereof, and a display device.

BACKGROUND

The liquid crystal display is a typical flat panel display device. The liquid crystal display includes a liquid crystal display panel and a backlight disposed on the back of the liquid crystal display panel. The light emitted by the backlight passes through the liquid crystal display panel to realize image display.

In the related art, as shown in FIG. 1, the liquid crystal display device includes a liquid crystal display panel and a backlight source 100. The liquid crystal display panel comprises a thin film transistor (TFT) substrate 001, a color filter (CF) substrate (i.e., a color film substrate) 002, a liquid crystal layer 003 and a sealant 004 disposed between the TFT substrate 001 and the CF substrate 002, an upper polarizer 005 disposed on a side of the color filter substrate 002 facing away from the liquid crystal layer 003, and a lower polarizer 006 disposed on a side of the TFT substrate 001 facing away from the liquid crystal layer 003. When the liquid crystal display is in operation, the light emitted by the backlight source 100 passes through the lower polarizer 006, the TFT substrate 001, the liquid crystal layer 003, the CF substrate 002, and the upper polarizer 005 in order, and finally enters the human eye. The lower polarizer 006 is used to polarize the light. The lower polarizer 006 and the upper polarizer 005 are arranged so that the light emitted by the backlight source 100 with a specific polarization direction can pass through. The CF substrate 002 is used to filter light. The display panel includes a plurality of pixel units. Each pixel unit can include three pixels, each of which emits light of one color under the illumination of the backlight source.

However, the use of the CF substrate results in loss of light energy, so the light transmittance of the display panel is low, and the display effect of the display panel is relatively poor.

SUMMARY

The embodiments of the present disclosure provide a display panel, a method for manufacturing the same, and a display device.

In the first aspect, a display panel is provided. The display panel includes a first substrate, a second substrate, a liquid crystal layer disposed between the first substrate and the second substrate, and a light splitting structure disposed on a side of the first substrate facing away from the liquid crystal layer.

The light splitting structure is configured to perform spectroscopic processing on light incident on the light splitting structure to obtain light of at least one color, and project the light of the at least one color onto a pixel of a corresponding color in the display panel.

Optionally, the display panel further includes a polarization structure. The polarization structure is disposed on the light splitting structure or on the first substrate, and the polarization structure is configured to perform polarization processing on light incident on the polarization structure.

Optionally, the light splitting structure includes a nanometer light splitting film, the nanometer light splitting film includes a plurality of light splitting modules arranged in an array, and each light splitting module includes a multi-step grating element.

Optionally, the polarization structure includes a wire grid polarizer, the wire grid polarizer includes a plurality of wire grids, and the plurality of wire grids are arranged on the light splitting structure or on the first substrate in an array.

Optionally, the display panel further includes: a diffusion film disposed on a side of the second substrate facing away from the liquid crystal layer.

Optionally, the multi-step grating element includes a plurality of steps with different heights and a same width. A period a, a step amount b, and a step width c of the multi-step grating element satisfy: $b*c=a$, and a step height is 0~10 μm.

Optionally, a step surface of the nanometer light splitting film faces the first substrate. The wire grid polarizer is integrally disposed on a side of the nanometer light splitting film facing the first substrate, a refractive index of the nanometer light splitting film is different from a refractive index of the wire grid polarizer, and the refractive index of the nanometer light splitting film is greater than a refractive index of air. Alternatively, the wire grid polarizer is integrally disposed on a side of the nanometer light splitting film facing away from the first substrate, and the refractive index of the nanometer light splitting film is greater than a refractive index of air.

Optionally, a distance between a surface of the nanometer light splitting film facing the first substrate and a surface of the second substrate facing the first substrate is 50~500 μm.

Optionally, a width e of the wire grid and the step width c of the multi-step grating element satisfy: $e*m=c$, m is a positive integer, the width of the wire grid is 10~200 nm, and a duty ratio of the wire grid is 50%.

Optionally, the display panel further includes a collimated backlight disposed at a side of the light splitting structure facing away from the liquid crystal layer.

In a second aspect, a method for manufacturing a display panel is provided. The manufacturing method includes: providing a first substrate and a second substrate, and disposing a liquid crystal layer between the first substrate and the second substrate; forming a light splitting structure on a side of the first substrate facing away from the liquid crystal layer; wherein the light splitting structure is configured to perform spectroscopic processing on light incident on the light splitting structure to obtain light of at least one color, and project the light of the at least one color onto a pixel of a corresponding color in the display panel.

Optionally, the manufacturing method further includes: forming a polarization structure on the light splitting structure or on the first substrate.

Optionally, the manufacturing method further includes: forming a diffusion film on a side of the second substrate facing away from the liquid crystal layer.

Optionally, the light splitting structure includes a nanometer light splitting film, the polarization structure includes a wire grid polarizer, the nanometer light splitting film includes a plurality of light splitting modules arranged in an array, and each splitting light module includes a multi-step grating element. The multi-step grating element includes a plurality of steps with different heights and a same width. A step surface of the nanometer light splitting film faces the first substrate.

The step of forming the polarization structure on the light splitting structure includes: forming the wire grid polarizer integrally on a side of the nanometer light splitting film facing the first substrate; a refractive index of the nanometer light splitting film is different from a refractive index of the wire grid polarizer, and the refractive index of the nanometer light splitting film is greater than a refractive index of air.

Alternatively, the step of forming the polarization structure on the light splitting structure includes: forming the wire grid polarizer integrally on a side of the nanometer light splitting film facing away from the first substrate; a refractive index of the nanometer light splitting film is greater than a refractive index of air.

In a third aspect, a display device is provided. The display device includes the display panel as described in the first aspect.

BRIEF DESCRIPTION OF THE DRAWINGS

In order to more clearly illustrate the technical solutions in embodiments of the disclosure, the appended drawings needed to be used in the description of the embodiments will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

Figure 1:
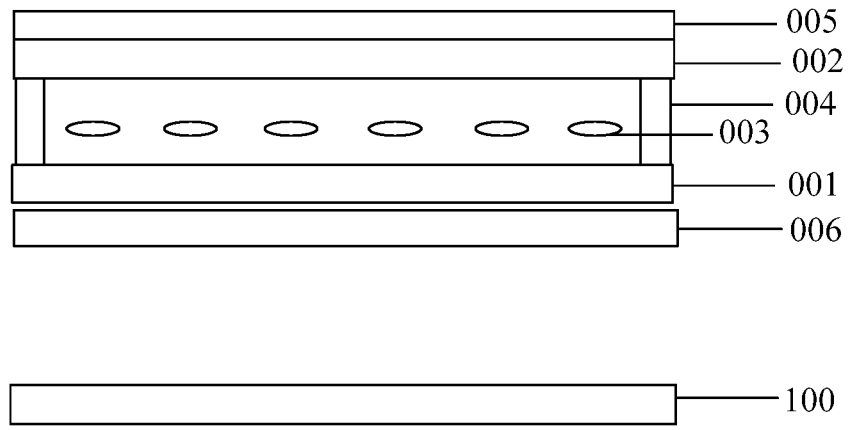
FIG. 1 is a structural schematic diagram of a liquid crystal display in a related art.
Figure 2A:
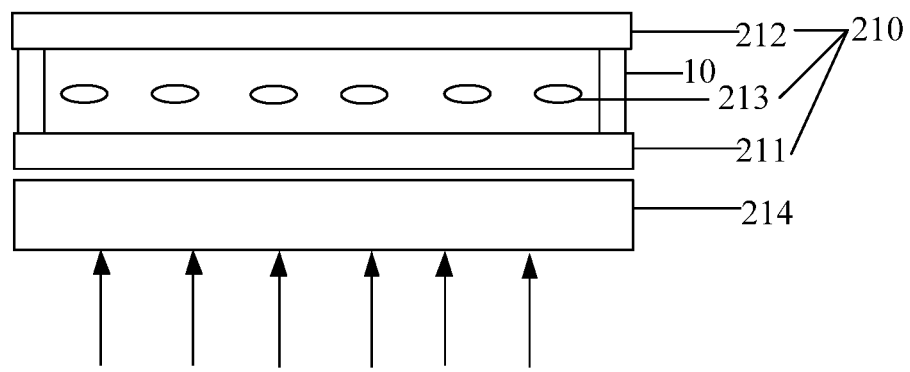
FIG. 2A is a structural schematic diagram of a display panel provided by an embodiment of the present disclosure.

An embodiment of the present disclosure provides a display panel. As shown in FIG. 2A, the display panel 210 includes a first substrate 211, a second substrate 212, a liquid crystal layer 213 disposed between the first substrate 211 and the second substrate 212, and a light splitting structure 214 disposed on a side of the first substrate 211 facing away from the liquid crystal layer 213.

The light splitting structure 214 is configured to perform spectroscopic processing on light incident on the light splitting structure 214 to obtain light of at least one color, and project the light of the at least one color onto a pixel of a corresponding color in the display panel. As shown in FIG. 2A, the display panel can further include a sealant 10.

To sum up, in the display panel provided by the embodiment of the present disclosure, the light splitting structure is provided on the side of the first substrate facing away from the liquid crystal layer; the light splitting structure is capable of performing spectroscopic processing on light incident on the light splitting structure to obtain light of at least one color, and projects the light of the at least one color onto a pixel of a corresponding color in the display panel. Therefore, the color filter substrate for filtering light is not required, so that the light transmittance is enhanced and the display effect of the display panel is improved.

The first substrate can be a TFT substrate. Since the light splitting structure can achieve the light splitting effect, the second substrate 212 in FIG. 2A can be a glass substrate. That is, it is unnecessary to form a color film substrate when manufacturing the display panel. In this way, the manufacturing process of the display panel is simplified, and the structure of the display panel is relatively simple.

The light splitting structure in the embodiment of the present disclosure can perform spectroscopic processing on light incident on the light splitting structure. The light incident on the light splitting structure can be light emitted from a collimated backlight. In order to ensure the light splitting effect, the light emitted from the collimated backlight should have a certain collimation degree. Optionally, the collimation degree of the light emitted from the collimated backlight can be −5°∼+5°. Optionally, the collimation degree of the light emitted from the collimated backlight is −2°∼+2°. In order to further improve the light splitting effect of the light splitting structure, the collimation degree of the light emitted from the collimated backlight is −0.5°∼+0.5°. The collimation degree refers to an included angle between the light emitted from the collimated backlight and the normal of the light incident surface of the light splitting structure (the smaller the included angle, the higher the collimation degree).

Figure 2B:
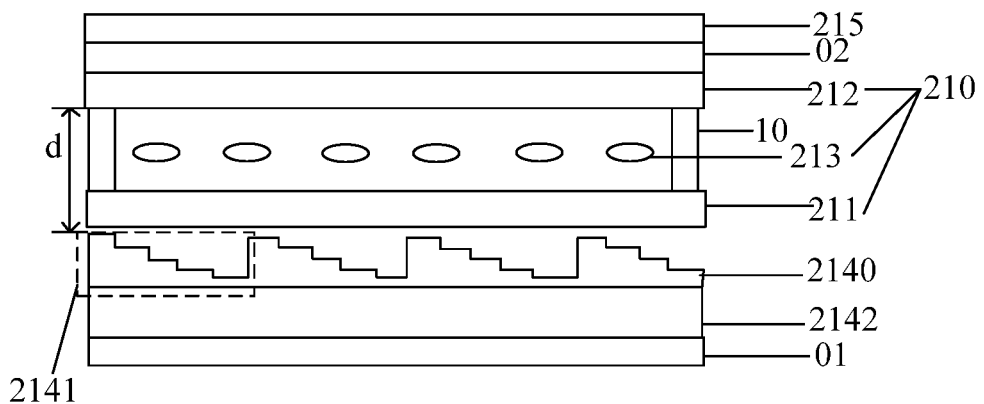
FIG. 2B is a schematic structural diagram of a display panel provided by another embodiment of the present disclosure.

As shown in FIG. 2B, the display panel 210 further includes a polarization structure 01. The polarization structure 01 can be disposed on the light splitting structure to polarize the light incident on the polarization structure. The polarization structure 01 can be a polarizer (this polarizer is also referred to as a lower polarizer). The light splitting structure is located between this polarizer and the first substrate 211, and the polarizer is directly attached to the light splitting structure. The periphery of the light splitting structure is adhered with the first substrate 211 through an adhesive, so that there is an air gap between the light splitting structure and the first substrate 211.

Further, as shown in FIG. 2B, the display panel 210 further includes a diffusion film 215 disposed on a side of the second substrate 212 facing away from the liquid crystal layer 213. Specifically, a side of the second substrate 212 facing away from the liquid crystal layer 213 is provided with a polarizer 02 (this polarizer is also referred to as an upper polarizer). The diffusion film 215 is arranged on the second substrate 212 on which the polarizer 02 is provided. Since the collimation degree of the light emitted from the polarizer 02 is high, the user can observe only a small part of the content through the display panel. In order to allow the user to observe more content, a diffusion film can be used to diffuse the light of the pixels with corresponding colors on the display panel, thereby increasing the viewing angle and improving the display effect. In addition, in practical applications, diffusion films with different degrees of scattering can also be used according to requirements. For example, for an anti-peeping product, a diffusion film with a degree of scattering of 10% 30% can be used; for a non-anti-peeping product such as a television, a diffusion film with a degree of scattering greater than 40% can be used.

Specifically, as shown in FIG. 2B, the light splitting structure includes a nanometer light splitting film 2140, the nanometer light splitting film 2140 includes a plurality of light splitting modules 2141 arranged in an array, and each light splitting module 2141 includes a multi-step grating element. The multi-step grating element includes a plurality of steps having different heights and the same width. The stepped surface of the nanometer light splitting film faces the first substrate. In order to cause diffraction of light, the refractive index of the nanometer light splitting film is greater than the refractive index of air. The larger the difference between the refractive index of the nanometer light splitting film and the refractive index of air, the better the light splitting effect of the nanometer light splitting film. Optionally, $1.2<n<2.0$ (n is the refractive index of the nanometer light splitting film). In practical applications, $1.45<n<1.65$.

Optionally, the light splitting modules can be periodically arranged with a period of the pixel length. The light splitting modules can be periodically arranged with a period of integer multiples of the pixel length. The light splitting modules can also be periodically arranged with a period of non-integer multiples of the pixel length. The pixel length refers to the length of the area where all the pixels included in each pixel unit are located. For example, each pixel unit includes three pixels, and the pixel length refers to the total length of the area where the three pixels are located.

For example, the nanometer light splitting film can be made of an organic transparent material, an inorganic transparent material, a high molecular polymer material, a resin material, or the like. The material of the nanometer light splitting film can be an oxide, such as indium tin oxide (ITO), indium zinc oxide (IZO), etc., or it can be a mixture of polymer oxides (or organic particles) and high molecular polymers. As shown in FIG. 2B, a film layer can be formed on the substrate 2142 to obtain the nanometer light splitting film. The substrate 2142 can be an optical glass substrate or an organic film made of an organic material. In addition, the nanometer light splitting film can also be directly obtained by, for example, etching a glass substrate.

Alternatively, the nanometer light splitting film can be formed by nano-imprinting, laser direct writing, electron beam direct writing, or a composition process. As for the specific processes of nano-imprinting, laser direct writing, electron beam direct writing, and composition process, reference can be made to the related art, and will not be repeated herein.

Figure 2C:
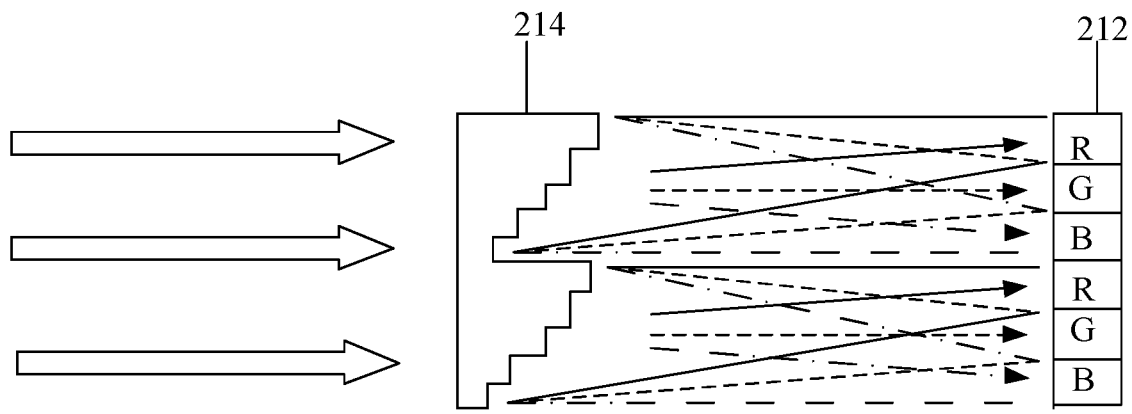
FIG. 2C is a spectroscopic display effect diagram of a multi-step grating element provided by an embodiment of the present disclosure.

FIG. 2C shows a spectroscopic display effect diagram of a multi-step grating element. The multi-step grating element is configured to perform spectroscopic processing on the light incident on the multi-step grating element to obtain light of different colors, such as red light, green light, and blue light. The light beam of each color is projected onto the pixels of the corresponding color in the display panel. Specifically, the red light is projected onto the red pixel (R), the green light is projected onto the green pixel (G), and the blue light is projected onto the blue pixel (B). In FIG. 2C, the reference sign 212 indicates a second substrate, and the reference sign 214 indicates a light splitting structure.

In the light splitting structure shown in FIGS. 2B, 2C, 3B, 3C, and 4B, the light splitting structure is composed of a plurality of sequentially repeated multi-step grating elements. Specifically, the parameters of the multi-step grating element include the period, the step amount, the step width, and the step height. The period of the multi-step grating element refers to the width of each multi-step grating element. The period a, the step amount b, and the step width c of the multi-step grating element satisfy: $b*c=a$. The step amount b and the step width c satisfy: $b*c=a$. The step amount b and the step width c can also satisfy: $b*c=m*a$, where m is a positive integer greater than or equal to 1. In addition, the period of the multi-step grating element, the wavelength of the light, and the refractive index of the grating material together determine the step height. Optionally, the step height can be 0 μm~10 μm. Optionally, the step height can be 0 μm~5 μm.

Considering factors such as the refractive index of the first substrate, the refractive index of the nanometer light splitting film, the step width and the step height of the nanometer light splitting film, as shown in FIG. 2B, the distance d between the surface of the nanometer light splitting film facing the first substrate 211 and the surface of the second substrate 212 facing the first substrate 211 is 50 μm~500 μm. Optionally, d is 100 μm~300 μm.

It should be noted that, the display modes of the display panel in the embodiment of the present disclosure can be advanced super dimension switch (ADS) mode, fringe field switching (FFS) mode, vertical alignment (VA) mode or twisted nematic (TN) mode, and the like, which is not limited in the embodiment of the disclosure.

The operating process of the display panel will now be described by taking each pixel unit including three pixels of R, G, and B as an example. Referring to FIG. 2B, when image display is required, the collimated backlight can be controlled to emit white collimated light, the white collimated light is diffracted by the light splitting structure, and the light splitting structure divides the white collimated light into red light, green light, and blue light. Under the optical switch action of the liquid crystal layer 213, the light beams of three colors are respectively projected onto the pixels of the corresponding colors in the display panel. The diffusion film 215 diffuses the light on the pixel of each color to increase the viewing angle and improve the display effect. The light transmittance of the display panel can be increased by 200%.

In the display panel provided by the embodiment of the present disclosure, the light splitting structure is provided on the side of the first substrate facing away from the liquid crystal layer; the light splitting structure is capable of performing spectroscopic processing on light incident on the light splitting structure to obtain light of at least one color, and projects the light of the at least one color onto a pixel of a corresponding color in the display panel. Therefore, the color filter substrate for filtering light is not required, so that the light transmittance is enhanced and the display effect of the display panel is improved.

Figure 3A:
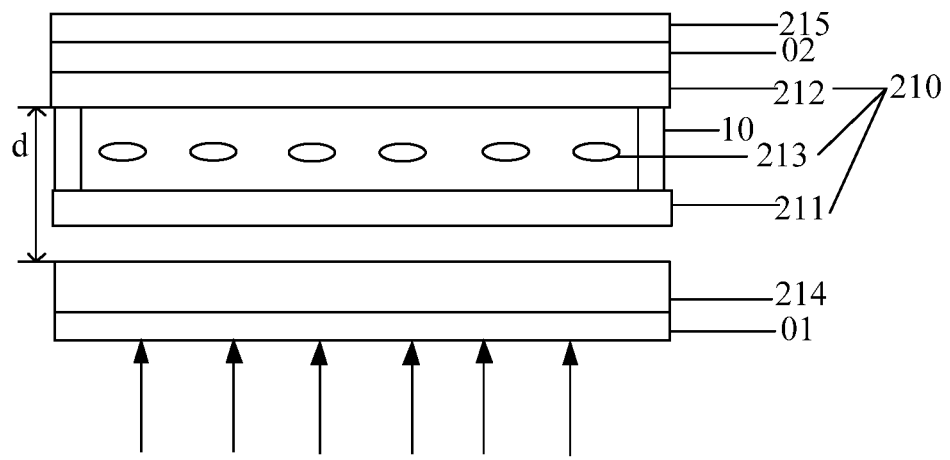
FIG. 3A is a structural schematic diagram of a display panel provided by still another embodiment of the present disclosure.

Another embodiment of the present disclosure provides a display panel. Referring to FIG. 3A, the display panel 210 includes a first substrate 211, a second substrate 212, and a liquid crystal layer 213 disposed between the first substrate 211 and the second substrate 212. A light splitting structure 214 is disposed on a side of the first substrate 211 facing away from the liquid crystal layer 213.

The light splitting structure 214 is configured to perform spectroscopic processing on light incident on the light splitting structure 214 to obtain light of at least one color, and project the light of the at least one color onto a pixel of a corresponding color in the display panel. As shown in FIG. 3A, the display panel 210 can further include a sealant 10. The periphery of the light splitting structure is adhered with the first substrate through an adhesive, so that there is an air gap between the light splitting structure and the first substrate.

The first substrate can be a TFT substrate. The display panel 210 can further include a polarization structure 01. The polarization structure 01 can be disposed on the light splitting structure to polarize the light incident on the polarization structure.

Figure 3B:
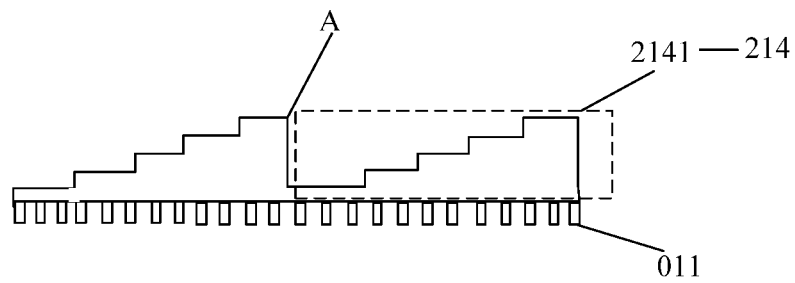
FIG. 3B is a structural schematic diagram of a nanometer light splitting film provided by an embodiment of the present disclosure.

As shown in FIG. 3B, the light splitting structure 214 includes a nanometer light splitting film, the nanometer light splitting film includes a plurality of light splitting modules 2141 arranged in an array, and each light splitting module 2141 includes a multi-step grating element. The multi-step grating element includes a plurality of steps having different heights and the same width. The period a, the step amount b, and the step width c of the multi-step grating element satisfy $b*c=a$ or $b*c=m*a$, where m is a positive integer greater than or equal to 1. Optionally, the step height can be 0 μm~10 μm. Optionally, the step height can be 0 μm~5 μm.

Referring to FIG. 3B, the wire grid polarizer can be integrally disposed on the side of the nanometer light splitting film facing away from the first substrate. In order to cause diffraction of light, the refractive index of the nanometer light splitting film is larger than that of air.

Similarly, the light splitting modules can be periodically arranged with a period of the pixel length. The light splitting modules can be periodically arranged with a period of integer multiples of the pixel length. The light splitting modules can also be periodically arranged with a period of non-integer multiples of the pixel length.

For example, the nanometer light splitting film can be made of an organic transparent material or an inorganic transparent material, and can also be made of other materials. The nanometer light splitting film can also be directly obtained by, for example, etching a glass substrate.

For example, the wire grid polarizer can be made of a metal material or a metal compound material having a relatively high dielectric constant. The wire grid period matches the step width of the nanometer light splitting film and the wire grid width. The wire grid width e and the step width c of the multi-step grating element satisfy: $e*m=c$, where m is a positive integer. This condition is satisfied by the wire grid width e and the step width c of the multi-step grating element so that each grating of the multi-step grating element can correspond to at least one wire grid. In this way, the at least one wire grid polarizes light, and each grating can perform spectroscopic processing on the polarized light.

The wire grid width is in the order of nanometers, and the wire grid width is smaller than the wavelength of visible light. Optionally, the wire grid width is 10 nm~200 nm. The wire grid thickness can also be in the order of nanometers. In addition, the duty cycle if the wire grid can be 50%. In practical applications, the duty cycle of the wire grid can be determined according to the process conditions. The duty cycle of the wire grid is the ratio of the etching width to the wire grid period. The wire grid period refers to a width of a single wire grid in the wire grid polarizer performing polarization.

In the related art, a lower polarizer for polarizing light is made of a multi-layered polymer material, such as polyvinyl alcohol, cellulose triacetate, and the like. The lower polarizer usually includes a pressure-sensitive adhesive, a release film and a protective film, and has a large thickness. The lower polarizer thus has a strong absorption effect to light. The thickness of the wire grid polarizer in the embodiments of the present disclosure is small. Therefore, compared to the lower polarizer in the related art, the display panel provided by the embodiments of the present disclosure can effectively reduce the light absorption rate and further improve the display effect. Furthermore, the total thickness of the display panel provided with the wire grid polarizer is reduced.

Figure 3C:
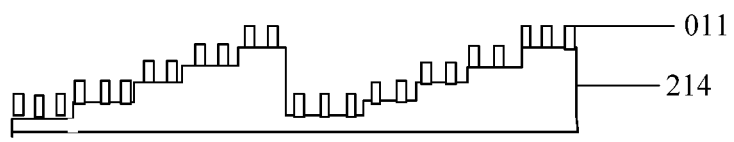
FIG. 3C is a structural schematic diagram of a nanometer light splitting film provided by another embodiment of the present disclosure.

In addition, as shown in FIG. 3C, the wire grid polarizer can also be integrally disposed on the side of the nanometer light splitting film facing the first substrate. In FIG. 3C, the reference sign 011 indicates a wire grid included in the wire grid polarizer, and the reference sign 214 indicates a light splitting structure. In order to cause diffraction of light, the refractive index of the nanometer light splitting film is different from that of the wire grid polarizer, and the refractive index of the nanometer light splitting film is larger than that of air. Optionally, the absolute value of the difference between the refractive index of the nanometer light splitting film and the refractive index of the wire grid polarizer is 0.2~1.0. Optionally, the absolute value of the difference between the refractive index of the nanometer light splitting film and the refractive index of the wire grid polarizer is 0.45~0.65.

For example, the nanometer light splitting film and the wire grid polarizer shown in FIG. 3B (or FIG. 3C) can be formed by means of nano-imprinting, laser direct writing or electron beam direct writing.

Further, as shown in FIG. 3A, the display panel 210 further includes a polarizer 02 (also referred to as an upper polarizer) disposed on a side of the second substrate 212 facing away from the liquid crystal layer 213. A diffusion film 215 is arranged on the second substrate 212 on which the polarizer 02 is provided. The diffusion film 215 is used for performing diffusion processing on the light on the pixels of corresponding colors in the display panel, so as to increase the viewing angle and improve the display effect.

Referring to FIG. 3A, the light splitting structure 214 includes a nanometer light splitting film. A distance d between a surface of the nanometer light splitting film facing the first substrate 211 and a surface of the second substrate 212 facing the first substrate 211 is 50 μm~500 μm. Optionally, d is 100 μm~300 μm.

For example, the display modes of the display panel can be advanced super dimension switch (ADS) mode, fringe field switching (FFS) mode, vertical alignment (VA) mode or twisted nematic (TN) mode, and the like.

Taking the display panel shown in FIG. 3A as an example, the operating process of the display panel will be described. When image display is required, the collimated backlight (disposed on the side of the first substrate facing away from the liquid crystal layer) can be controlled to emit white collimated light, and the wire grid polarizer is configured to perform polarization processing on the white collimated light. Since the wire grid polarizer is made of a metallic material, a part of the light is transmitted and another part of the light is reflected. The light from the wire grid polarizer is diffracted by the light splitting structure 214. The light splitting structure 214 divides the white collimated light into red light, green light, and blue light. Under the action of optical switching of the liquid crystal layer 213, the light beams of three colors are respectively projected onto the pixels of corresponding colors in the display panel. The diffusion film 215 further performs diffusion processing on the light of each color pixel so as to increase the viewing angle and improve the display effect. The light transmittance of the display panel can be increased by 240%.

Figure 4A:
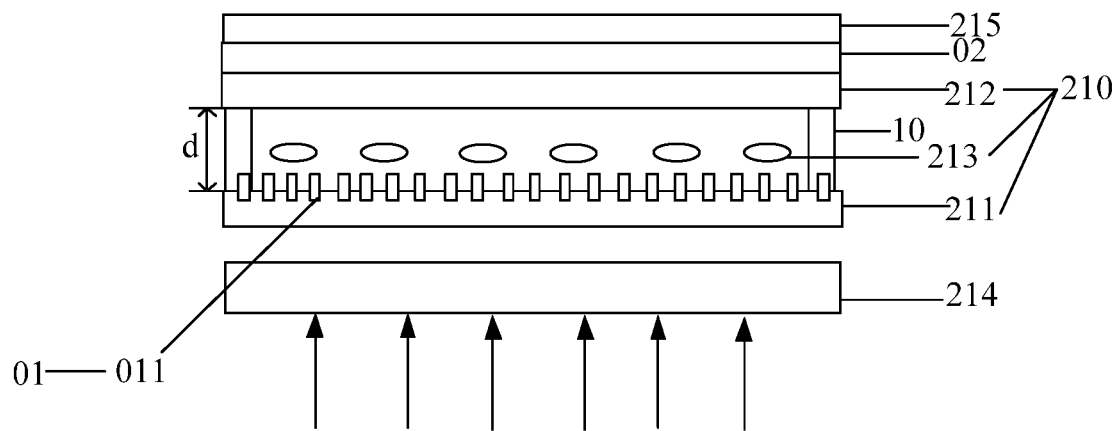
FIG. 4A is a structural schematic diagram of a display panel provided by still another embodiment of the present disclosure.

The embodiment of the present disclosure also provides yet another display panel. As shown in FIG. 4A, the polarization structure 01 is disposed on the first substrate 211.

The light splitting structure 214 includes a nanometer light splitting film. The nanometer light splitting film includes a plurality of light splitting modules arranged in an array. Each light splitting module includes a multi-step grating element. The multi-step grating element includes a plurality of steps with different heights and the same width.

Figure 4B:
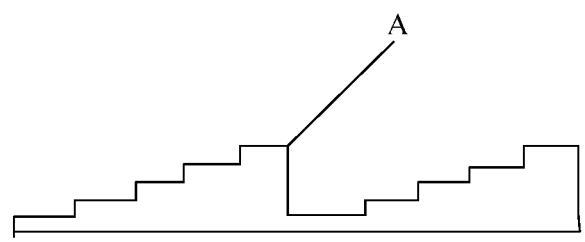
FIG. 4B is a structural schematic diagram of a nanometer light splitting film provided by an embodiment of the present disclosure.

Referring to FIG. 4A, the polarization structure 01 includes a wire grid polarizer, the wire grid polarizer includes a plurality of wire grids 011, and the plurality of wire grids 011 are arranged on the first substrate 211 in an array. The wire grid polarizer is disposed on the side of the first substrate 211 facing the liquid crystal layer 213. In order to cause diffraction of light, as shown in FIG. 4B, when the step surface A of the nanometer light splitting film faces the first substrate, an air gap is maintained between the nanometer light splitting film and the first substrate; when the step surface A of the nanometer light splitting film faces the collimated backlight for emitting light, an air gap is maintained between the nanometer light splitting film and the collimated backlight.

Figure 4C:
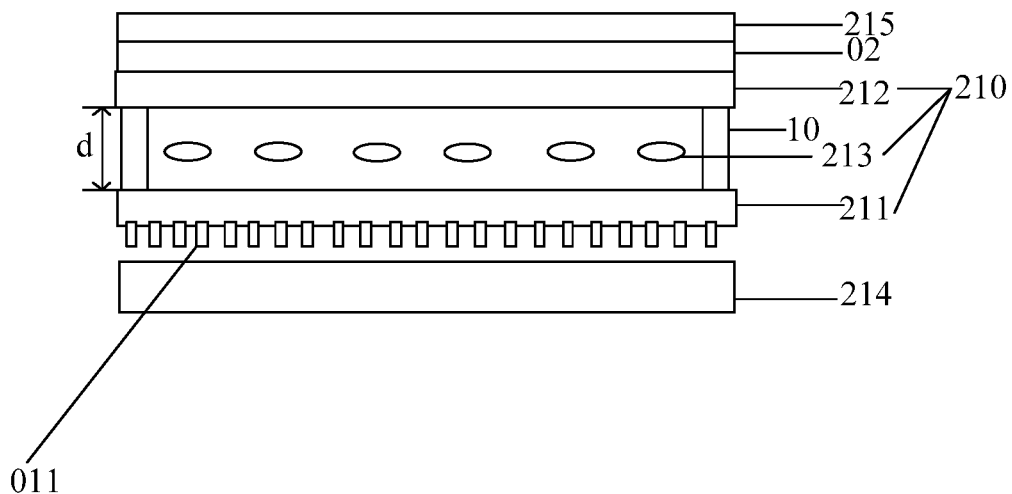
FIG. 4C is a structural schematic diagram of a display panel provided by an embodiment of the present disclosure.

Referring to FIG. 4C, the wire grid polarizer can also be disposed on the side of the first substrate 211 facing away from the liquid crystal layer. In order to cause diffraction of light, as shown in FIG. 4B, when the step surface A of the nanometer light splitting film faces the first substrate, an air gap is maintained between the nanometer light splitting film and the wire grid polarizer; when the step surface A of the nanometer light splitting film faces the collimated backlight for emitting light, an air gap is maintained between the nanometer light splitting film and the collimated backlight.

Optionally, the wire grid polarizer can be integrally disposed on the first substrate by means of nano-imprinting, laser direct writing or electron beam direct writing.

The meanings of other marks in FIGS. 4A and 4C can refer to FIG. 3A.

It should be noted that, in the related art, in order to increase the light transmittance of the display panel, the voltage applied on the backlight source is typically increased to increase the light energy, but this results in a high power consumption of the display device. The display panel provided by the embodiment of the present disclosure can achieve the effect of increasing the light transmittance without increasing the light energy. Therefore, the power consumption of the display device is reduced, and the standby time of the product can be improved.

In the display panel provided by the embodiment of the present disclosure, the light splitting structure is provided on the side of the first substrate facing away from the liquid crystal layer; the light splitting structure is capable of performing spectroscopic processing on light incident on the light splitting structure to obtain light of at least one color, and projects the light of the at least one color onto a pixel of a corresponding color in the display panel. Therefore, the color filter substrate for filtering light is not required. The wire grid polarizer included in the polarizing structure can polarize the light incident on the polarizing structure, effectively reducing the light absorption rate, increasing the light transmittance, and improving the display effect of the display panel.

Figure 5:
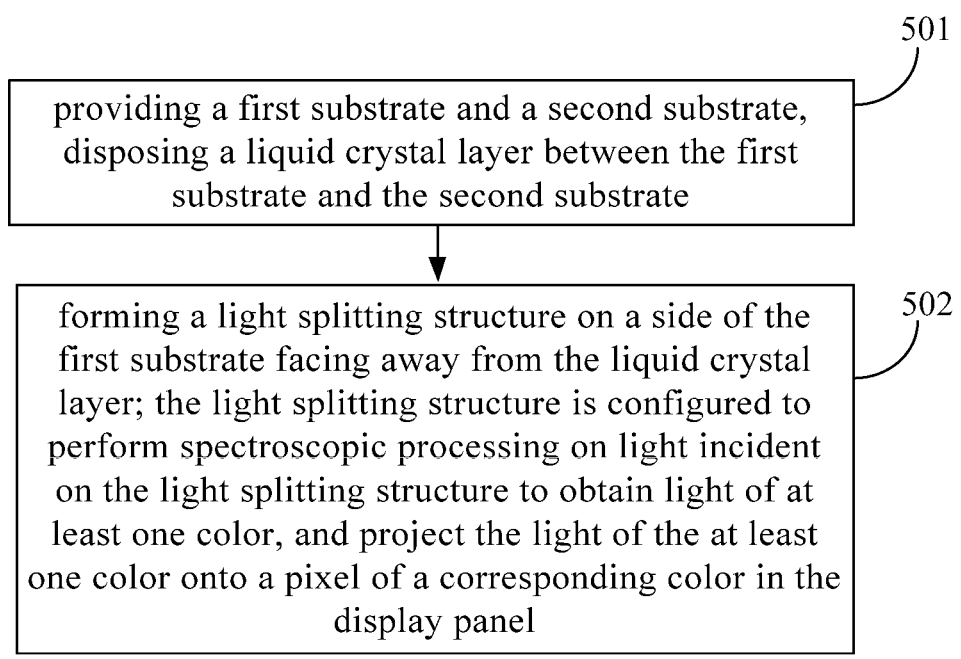
FIG. 5 is a flowchart of a method for manufacturing a display panel provided by an embodiment of the present disclosure.

An embodiment of the present disclosure provides a method for manufacturing a display panel. As shown in FIG. 5, the manufacturing method includes the following steps.

Step 501, providing a first substrate and a second substrate are provided; disposing a liquid crystal layer between the first substrate and the second substrate.

Step 502: forming a light splitting structure on a side of the first substrate facing away from the liquid crystal layer. The light splitting structure is configured for performing spectroscopic processing on light incident on the light splitting structure to obtain light of at least one color, and projecting the light of the at least one color onto a pixel of a corresponding color in the display panel.

According to the method for manufacturing the display panel provided by the embodiment of the present disclosure, the light splitting structure is provided on the side of the first substrate facing away from the liquid crystal layer; the light splitting structure is capable of performing spectroscopic processing on light incident on the light splitting structure to obtain light of at least one color, and projects the light of the at least one color onto a pixel of a corresponding color in the display panel. Therefore, the color filter substrate for filtering light is not required, so that the light transmittance is enhanced and the display effect of the display panel is improved.

Figure 6:
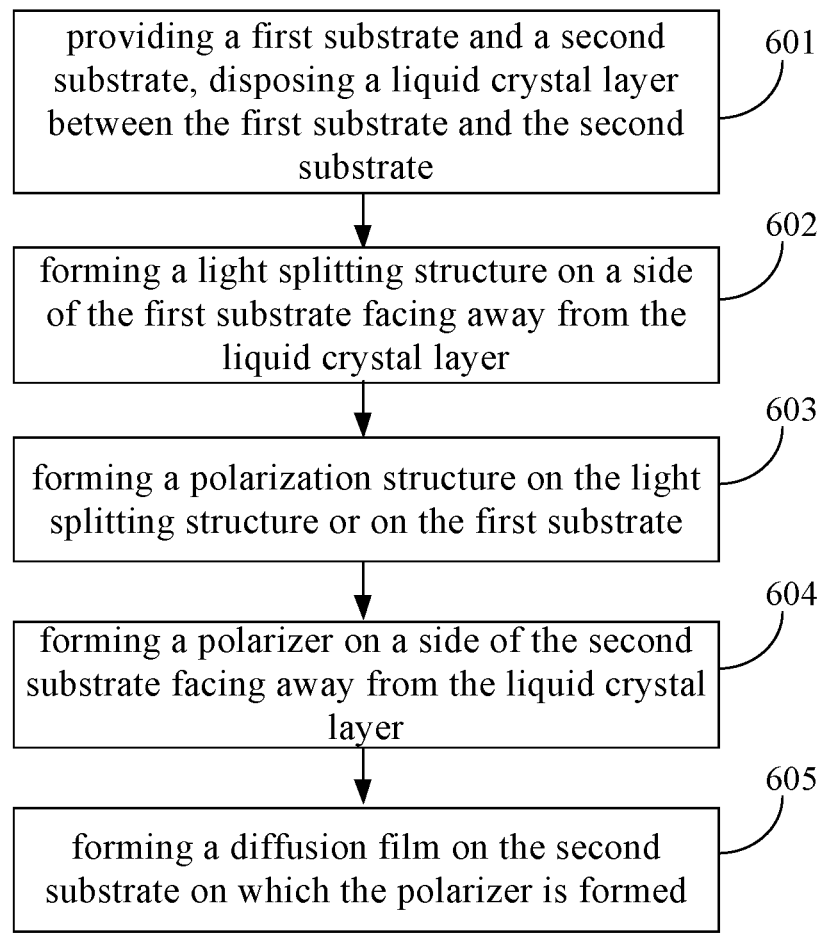
FIG. 6 is a flowchart of a method for manufacturing a display panel provided by another embodiment of the present disclosure.

An embodiment of the present disclosure provides another method for manufacturing a display panel. As shown in FIG. 6, the manufacturing method includes the following steps.

Step 601: providing a first substrate and a second substrate; disposing a liquid crystal layer between the first substrate and the second substrate.

As shown in FIG. 2A, the display panel 210 includes a first substrate 211, a second substrate 212, and a liquid crystal layer 213 disposed between the first substrate 211 and the second substrate 212. The first substrate can be a TFT substrate.

Step 602: forming a light splitting structure on a side of the first substrate facing away from the liquid crystal layer.

As shown in FIG. 2A, the light splitting structure 214 is formed on the side of the first substrate 211 facing away from the liquid crystal layer 213. The light splitting structure 214 is configured to perform spectroscopic processing on the light incident on the light splitting structure to obtain light of at least one color, and project the light of the at least one color onto a pixel of a corresponding color in the display panel. Optionally, the light splitting structure can perform spectroscopic processing on the light emitted from a collimated backlight.

The light splitting structure includes a nanometer light splitting film. The nanometer light splitting film includes a plurality of light splitting modules, each light splitting module includes a multi-step grating element, and the multi-step grating element includes a plurality of steps with different heights and the same width. The main parameters of the multi-step grating element (such as the period, the step amount, etc.) can be referred to the related description in the above embodiments of the display panels.

Step 603: forming a polarization structure on the light splitting structure or on the first substrate.

As shown in FIG. 4A, a wire grid polarizer is formed on a side of the first substrate facing the liquid crystal layer 213. When a step surface of the nanometer light splitting film (i.e., the surface indicated by A in FIG. 4B) faces the first substrate 211, an air gap is maintained between the nanometer light splitting film and the first substrate 211; when the step surface of the nanometer light splitting film faces a collimated backlight for emitting light, an air gap is maintained between the nanometer light splitting film and the collimated backlight.

Alternatively, as shown in FIG. 4C, a wire grid polarizer is formed on a side of the first substrate facing away from the liquid crystal layer 312. When the step surface of the nanometer light splitting film faces the first substrate 211, an air gap is maintained between the nanometer light splitting film and the wire grid polarizer; when the step surface of the nanometer light splitting film faces a collimated backlight for emitting light, an air gap is maintained between the nanometer light splitting film and the collimated backlight.

Step 604: forming a polarizer on a side of the second substrate facing away from the liquid crystal layer.

As shown in FIG. 2B, FIG. 3A, FIG. 4A, or FIG. 4C, a polarizer 02 is formed on the side of the second substrate 212 facing away from the liquid crystal layer 213.

Step 605: forming a diffusion film on the second substrate on which the polarizer is formed.

As shown in FIG. 2B, FIG. 3A, FIG. 4A, or FIG. 4C, a diffusion film 215 is formed on the second substrate 212 on which the polarizer 02 is formed. The diffusion film is used for performing diffusion processing on the light on the pixels of corresponding colors in the display panel to increase the viewing angle and improve the display effect.

According to the method for manufacturing the display panel provided by the embodiment of the present disclosure, the light splitting structure is provided on the side of the first substrate facing away from the liquid crystal layer; the light splitting structure is capable of performing spectroscopic processing on light incident on the light splitting structure to obtain light of the at least one color onto a pixel of a corresponding color in the display panel. Therefore, the color filter substrate for filtering light is not required. The wire grid polarizer included in the polarizing structure can polarize the light incident on the polarizing structure, effectively reducing the light absorption rate, increasing the light transmittance, and improving the display effect of the display panel.

Figure 7:
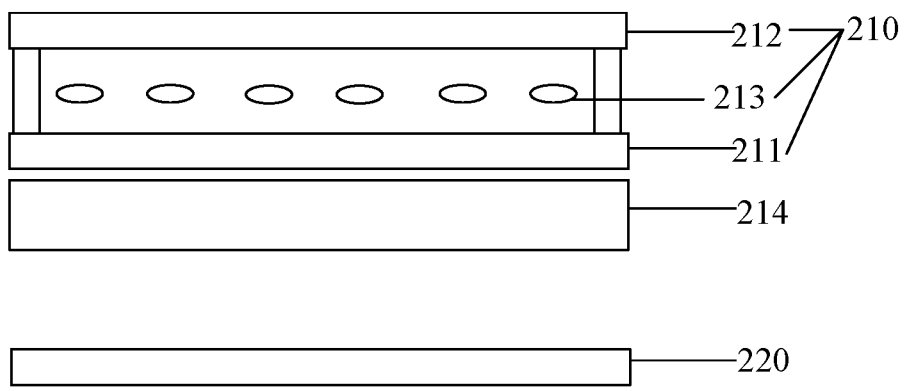
FIG. 7 is a structural schematic diagram of a display device provided by an embodiment of the present disclosure.

An embodiment of the present disclosure further provides a display device. As shown in FIG. 7, the display device 700 includes a display panel 210 and a collimated backlight 220 disposed on a side of the light splitting structure 214 facing away from the liquid crystal layer 213.

The display panel 210 can be the display panel shown in FIG. 2A, FIG. 2B, FIG. 3A, FIG. 4A, or FIG. 4C.

The display panel 210 includes a first substrate 211, a second substrate 212, and a liquid crystal layer 213 disposed between the first substrate 211 and the second substrate 212. A side of the first substrate 211 facing away from the liquid crystal layer 213 is provided with a light splitting structure 214.

The collimated backlight 220 is disposed on the side of the light splitting structure 214 facing away from the liquid crystal layer 213. Therefore, the light splitting structure 214 is used to perform spectroscopic processing on the light of the collimated backlight 220 to obtain light of at least one color, and project the light of the at least one color onto a pixel of a corresponding color in the display panel.

Optionally, the collimation degree of the light emitted from the collimated backlight can be −5°~+5°. Optionally, the collimation degree of the light emitted from the collimated backlight is −2°~+2°. In order to further improve the light splitting effect of the light splitting structure, the collimation degree of the light emitted from the collimated backlight is −0.5°~+0.5°.

According to the display device provided by the embodiment of the present disclosure, the light splitting structure is provided on the side of the first substrate facing away from the liquid crystal layer; the light splitting structure is capable of performing spectroscopic processing on light incident on the light splitting structure to obtain light of at least one color, and projects the light of the at least one color onto a pixel of a corresponding color in the display panel. Therefore, the color filter substrate for filtering light is not required, so that the light transmittance is enhanced and the display effect of the display device is improved.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A display panel, comprising:
a first substrate, a second substrate, a liquid crystal layer disposed between the first substrate and the second substrate, a light splitting structure disposed on a side of the first substrate facing away from the liquid crystal layer, and a polarization structure disposed on the light splitting structure or on the first substrate;
wherein the light splitting structure is configured to perform spectroscopic processing on light incident on the light splitting structure to obtain light of at least one color, and project the light of the at least one color onto a pixel of a corresponding color in the display panel;
wherein the light splitting structure comprises a nanometer light splitting film, the nanometer light splitting film comprises a plurality of light splitting modules arranged in an array, and each of the plurality of light splitting modules comprises a multi-step grating element;
wherein the multi-step grating element comprises a plurality of steps with different heights and a same width; a period a, a step amount b, and a step width c of the multi-step grating element satisfy: b*c=a, and a step height is about 0~10 μm,
wherein the polarization structure is configured to perform polarization processing on light incident on the polarization structure, the polarization structure comprises a wire grid polarizer, and wire grid polarizer comprises a plurality of wire grids, and the plurality of wire grids are arranged on the light splitting structure or on the first substrate in an array;

and wherein a width e of the wire grid and a step width c of the multi-step grating element satisfy: e*m=c, m is a positive integer, the width of the wire grid is about 10~200 nm, and a duty ratio of the wire grid is about 50%.

2. The display panel according to claim 1, further comprising: a diffusion film disposed on aside of the second substrate facing away from the liquid crystal layer.

3. The display panel according to claim 1, wherein a step surface of the nanometer light splitting film faces the first substrate;

a wire grid polarizer is integrally disposed on a side of the nanometer light splitting film facing the first substrate, a refractive index of the nanometer light splitting film is different from a refractive index of the wire grid polarizer, and the refractive index of the nanometer light splitting film is greater than a refractive index of air; alternatively, the wire grid polarizer is integrally disposed on a side of the nanometer light splitting film facing away from the first substrate, and a refractive index of the nanometer light splitting film is greater than a refractive index of air.

4. The display panel according to claim 1, further comprising: a collimated backlight disposed at a side of the light splitting structure facing away from the liquid crystal layer.

5. A display device comprising the display panel according to claim 1.

6. The display device according to claim 5, wherein a step surface of the nanometer light splitting film faces the first substrate;

a wire grid polarizer is integrally disposed on a side of the nanometer light splitting film facing the first substrate, a refractive index of the nanometer light splitting film is different from a refractive index of the wire grid polarizer, and the refractive index of the nanometer light splitting film is greater than a refractive index of air; alternatively, the wire grid polarizer is integrally disposed on a side of the nanometer light splitting film facing away from the first substrate, and a refractive index of the nanometer light splitting film is greater than a refractive index of air.

7. A method for manufacturing a display panel, comprising:

providing a first substrate and a second substrate, disposing a liquid crystal layer between the first substrate and the second substrate;

forming a light splitting structure on a side of the first substrate facing away from the liquid crystal layer; wherein the light splitting structure is configured to perform spectroscopic processing on light incident on the light splitting structure to obtain light of at least one color, and project the light of the at least one color onto a pixel of a corresponding color in the display panel; and forming a polarization structure on the light splitting structure or on the first substrate;

wherein the light splitting structure comprises a nanometer light splitting film, the polarization structure comprises a wire grid polarizer, the nanometer light splitting film comprises a plurality of light splitting modules arranged in an array, and each of the splitting light modules comprises a multi-step grating element; the multi-step grating element comprises a plurality of steps with different heights and a same width; a step surface of the nanometer light splitting film faces the first substrate;

wherein the step of forming the polarization structure on the light splitting structure comprises:

forming the wire grid polarizer integrally on a side of the nanometer light splitting film facing the first substrate, a refractive index of the nanometer light splitting film being different from a refractive index of the wire grid polarizer, and the refractive index of the nanometer light splitting film being greater than a refractive index of air; alternatively, forming the wire grid polarizer integrally on a side of the nanometer light splitting film facing away from the first substrate, a refractive index of the nanometer light splitting film being greater than a refractive index of air.

8. The method according to claim 7, further comprising: forming a polarization structure on the light splitting structure or on the first substrate.

9. A display panel, comprising: a first substrate, a second substrate, a liquid crystal layer disposed between the first substrate and the second substrate, and alight splitting structure disposed on a side of the first substrate facing away from the liquid crystal layer; wherein the light splitting structure is configured to perform spectroscopic processing on light incident on the light splitting structure to obtain light of at least one color, and project the light of the at least one color onto a pixel of a corresponding color in the display panel; wherein the light splitting structure comprises a nanometer light splitting film, the nanometer light splitting film comprises a plurality of light splitting modules arranged in an array, and each of the plurality of light splitting modules comprises a multi-step grating element; and wherein a distance between a surface of the nanometer light splitting film facing the first substrate and a surface of the second substrate facing the first substrate is about 50~500 μm.

* * * * *